May 19, 1931.　　　R. R. HOLDEN　　　1,806,164
TROLLEY GUIDE
Filed Oct. 10, 1930　　3 Sheets-Sheet 1

Inventor:
Richard Roy Holden

May 19, 1931. R. R. HOLDEN 1,806,164
TROLLEY GUIDE
Filed Oct. 10, 1930  3 Sheets-Sheet 2
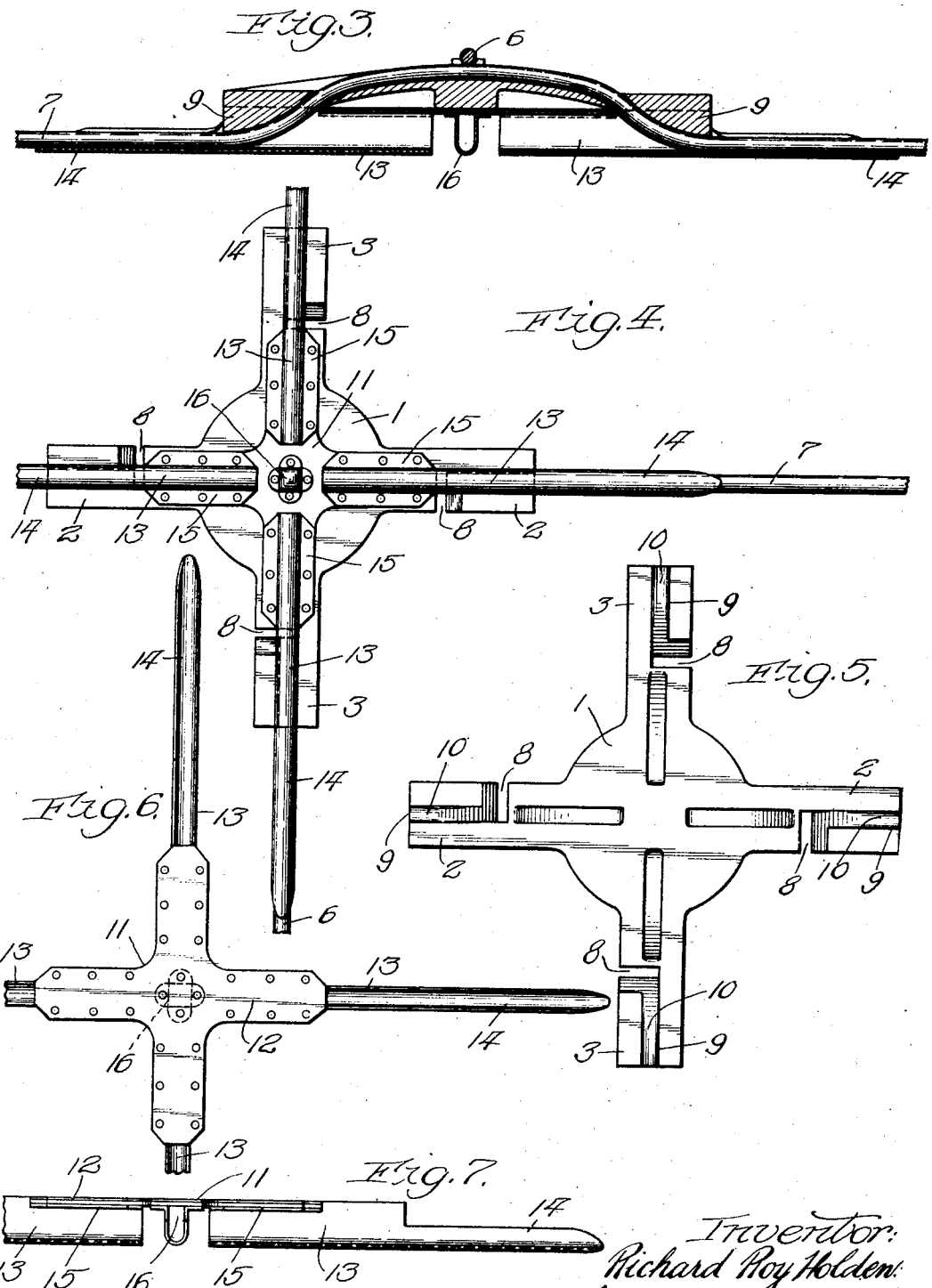

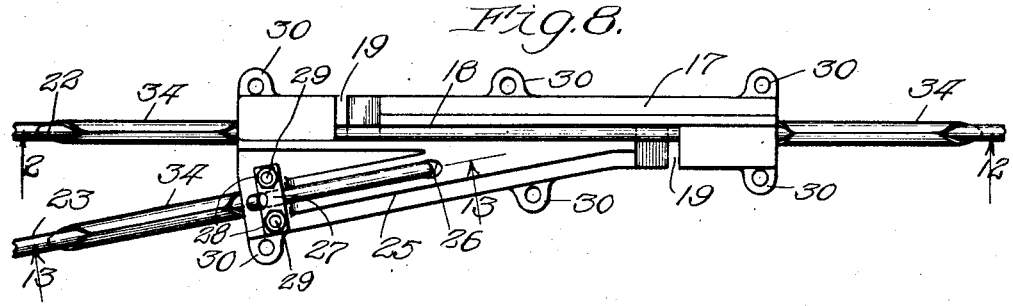
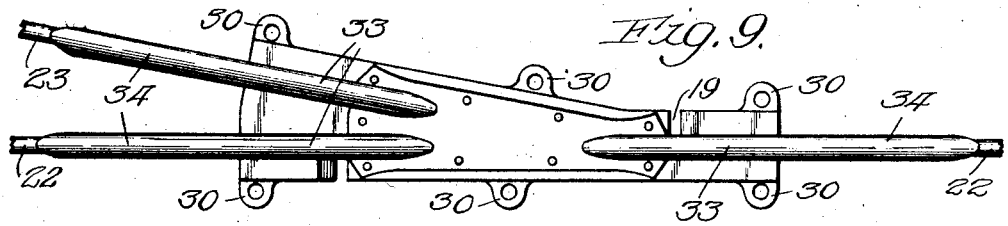
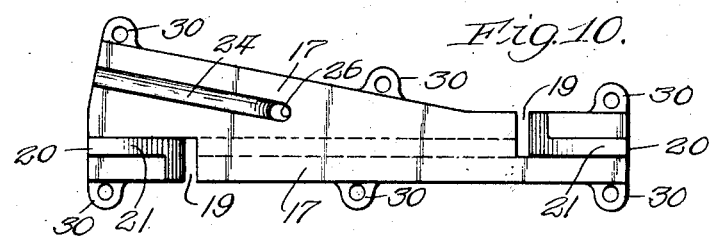
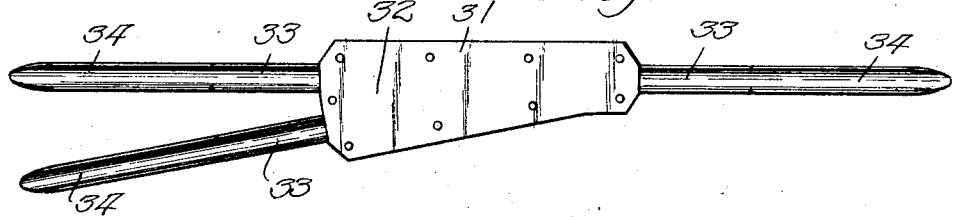
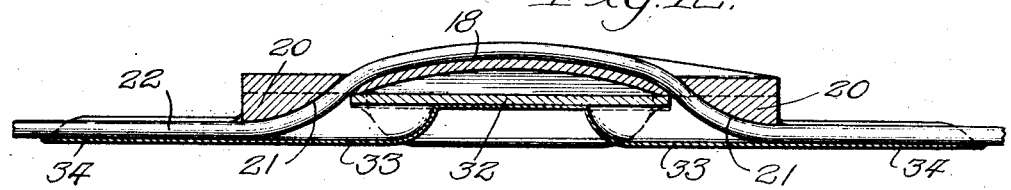
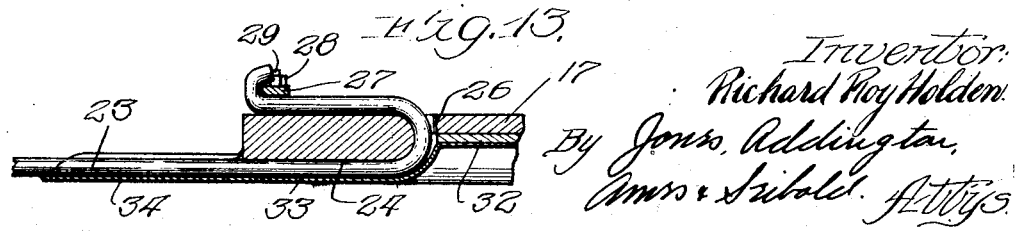

Patented May 19, 1931

1,806,164

UNITED STATES PATENT OFFICE

RICHARD ROY HOLDEN, OF HIGHLAND PARK, ILLINOIS

TROLLEY GUIDE

Application filed October 10, 1930. Serial No. 487,671.

This invention relates to a trolley wire positioning member and has special reference to trolley cross-overs, switches, frogs and the like.

More particularly, this invention relates to a two-piece trolley wire positioning member comprising an upper or supporting portion which is adapted to be permanently attached to the crossing or connecting trolley wires and a lower portion which is adapted to be easily removed when such is desirable.

With cross-overs, switches and the like, made in one piece, as is generally done, if any part is defective or becomes worn the whole device must be removed and replaced. Furthermore, the means usually employed for securing the cross-overs, switches and the like in position with respect to the trolley wires comprises clamps, bolts and nuts, thereby making it quite an operation to fasten or remove these members.

The present device provides a two-piece trolley positioning member in which the upper or supporting portion is adapted to be permanently attached to the trolley wires, it being only necessary to remove this portion when the trolley wires are themselves taken down or replaced. This upper portion is provided with novel means whereby it may be easily and quickly attached to the trolley wires without the use of any clamps, bolts or the like. A lower member which includes the trolley runners and approaches is adapted to be positioned under the upper member and secured in place by merely clamping the approaches over the trolley wires. With this construction, the lower member which receives the greatest wear may be easily removed by merely spreading the clamped ends of the approaches.

An object of this invention is to provide a two-piece trolley wire positioning member in which the upper portion is adapted to be permanently attached to the wires while the lower portion which receives substantially all the wear may be easily removed and replaced.

A further object of this invention is to provide a trolley wire positioning member having novel securing means and which may be easily and securely attached to the trolley wires without the use of securing clamps, bolts and the like.

Further objects and advantages will be apparent from the following description taken together with the accompanying drawings in which latter:

Fig. 3 is a central vertical cross sectional view;

Fig. 4 is a bottom plan view of the device;

Fig. 5 is a bottom plan view of the upper portion of the device;

Fig. 6 is a partial top plan view of the lower portion;

Fig. 7 is a partial side elevational view of the lower portion;

Fig. 8 is a top plan view of a trolley frog or switch embodying the present invention assembled in connection with connecting trolley wires;

Fig. 9 is a bottom plan view of the device shown in Fig. 8;

Fig. 10 is a bottom plan view of the upper portion of the device shown in Fig. 8;

Fig. 11 is a top plan view of the lower portion of the device shown in Fig. 8;

Fig. 12 is a cross sectional view taken on the line 12—12 of Fig. 8; and

Fig. 13 is a cross sectional view taken on the line 13—13 of Fig. 8.

Figure 1:
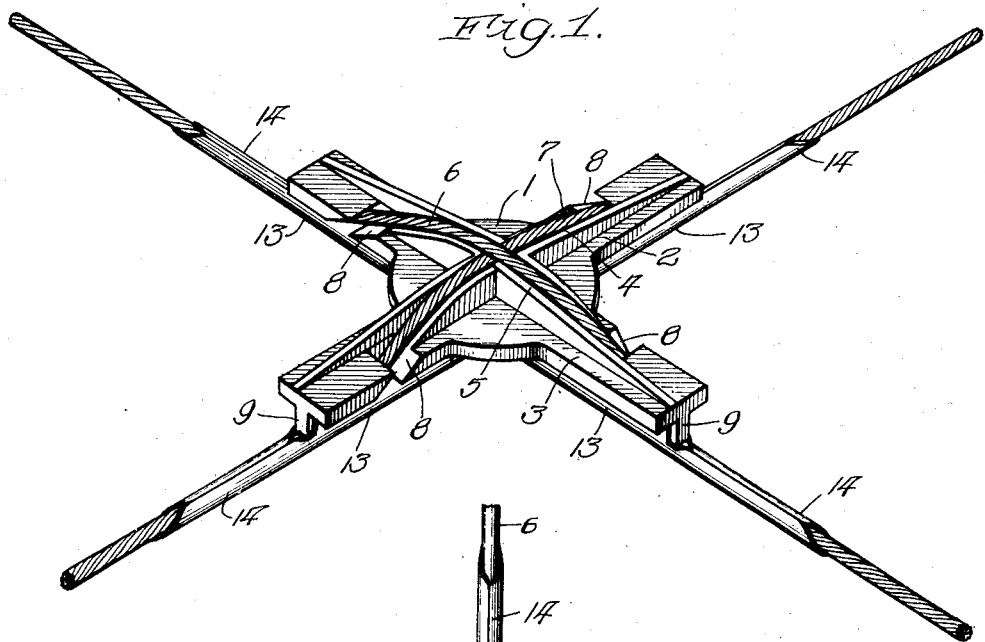
Figure 1 is a perspective view of an embodiment of the present invention assembled in connection with crossed trolley wires.
Figure 2:
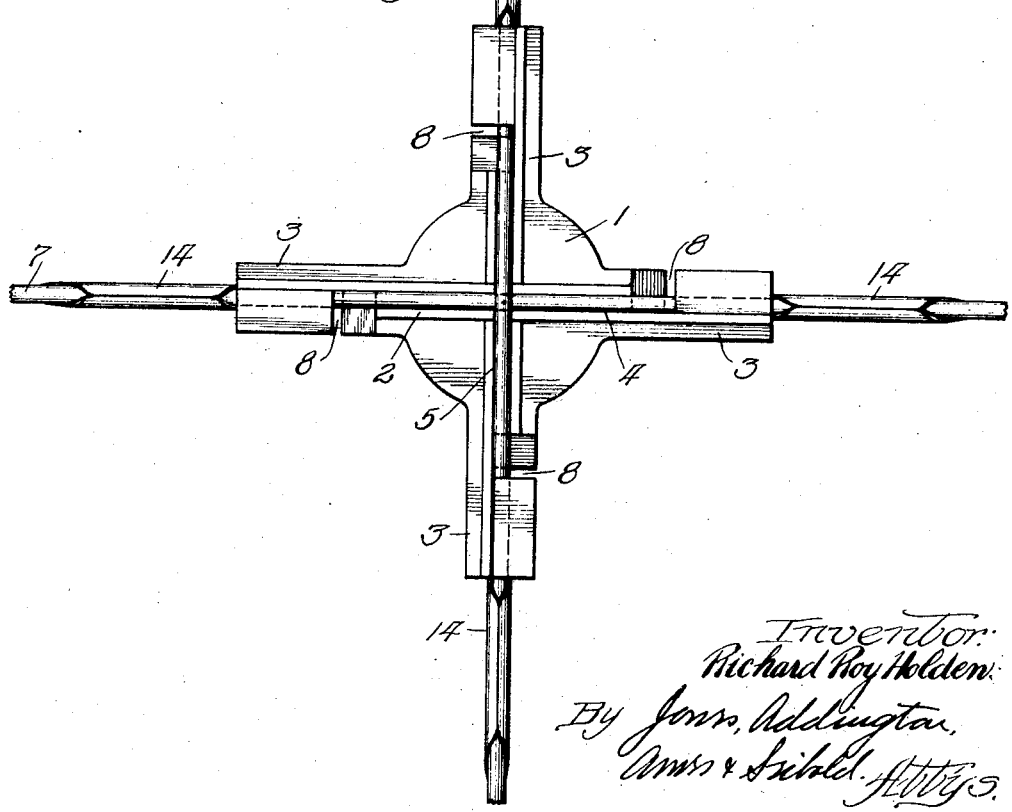
Fig. 2 is a top plan view of the device shown in Figure 1.

Referring more particularly to the drawings, the construction shown in Figs. 1 to 7 comprises an upper cross arm member 1 having crossed arms 2 and 3. The upper cross arm member 1 is provided with upwardly bowed channels 4 and 5, the channel 5 extending upwardly above the channel 4 so that the trolley wire 6 will cross above the trolley wire 7. Notches or slots 8 are provided in the arms 2 and 3 adjacent the outer ends of the upwardly bowed channels 4 and 5. These notches 8 extend inwardly from the sides of the arms and are formed on opposite sides of the arms so that all the slots extend into the arms in either a clockwise or counter-clockwise direction.

Downwardly extending curved portions 9 having channels 10 in the bottom sides thereof are formed at the outer ends of the upper cross arm member 1 and are preferably formed integrally with the upper member 1. With this construction to fasten the upper cross arm member 1 to the crossed trolley wires 6 and 7, it is only necessary to slide the trolley wire 7 inwardly in the slots 8 so that the wire lies in the upwardly bowed channel 4 and the channels 10 in the downwardly extending curved portions 9. The same operation is then repeated with respect to the other trolley wire and the arm 3. When thus attached, the upper member 1 is securely fastened to the crossed trolley wires and no further securing means are necessary.

The lower cross arm member 11 comprises a plate 12 which is in the form of a cross. U-shaped trolley runners 13 having approach portions 14 are secured to the lower side of the plate 12 with the open side facing upwardly. Any means may be employed for fastening the runners 13 to the plate 12 such as riveting the plate to outwardly extending flange portions 15 of the runners 13 or they may be formed integrally with the plate. A lug 16 is secured to the plate 12 between the inner ends of the runners 13 by any desirable means. This lug 16 serves to guide the trolley between the inner ends of the runners 13. To secure the lower member 11 to the upper member 1 after the latter has been properly fastened to the trolley wires, the lower member 11 is positioned under the upper member 1 so that the downwardly extending curved portions 9 will fit between the upwardly extending sides of the runners 13. The upper sides of the approach portions 14 are then clamped together over the trolley wires. This securely holds the lower portion 11 in place and will prevent any movement thereof with respect to the upper portion 1.

Although the cross-over is shown and described as having the arms rigidly fixed at right angles to each other, it is evident that the arms may be placed at any angle or may be adjustable. This construction may also be used with any number of arms to take care of two or more crossing trolley wires.

Figs. 8 to 13 show a trolley switch or frog embodying the present invention. This switch or frog comprises an upper or supporting member 17 having a longitudinally extending upwardly bowed channel 18 with slots 19 extending inwardly from opposite sides of the supporting member 17 adjacent the ends of the upwardly bowed channel 18. These slots 19, as well as the slots 8 previously described, are cut at an angle to the plane of the supporting members 1 and 17 so that the edges thereof will not cut or wear the trolley wires at the point of contact. Downwardly extending curved portions 20, similar to the downwardly extending curved portions 9, are secured to the under side of the supporting portion 17 and are provided with downwardly facing channels 21. Trolley wire 22 would be positioned with respect to the supporting member 17 in the manner previously described in positioning the crossover.

The connecting trolley wire 23 is positioned in the channel 24 in the bottom of the outwardly extending portion 25 of the supporting portion 17 and is then bent up through the slot 26 after which it is doubled back on top of the portion 25 and secured by the plate 27 which is clamped over the end thereof by means of nuts 28 threading onto the upwardly extending bolts 29. In order to hold the upper portion 17 in place and use the same as a strain plate, ears 30 are provided to which guy wires may be secured.

The lower portion 31 of the switch or frog comprises a guide plate 32 having runner portions 33 extending outwardly therefrom which are adapted to engage the trolley wires. Approach portions 34 are provided on the end of the runners 33 and are preferably formed integrally therewith. The lower portion 31 is secured to the upper portion 17 in a manner similar to that employed in fastening the lower portion 11 of the crossover to the upper portion 1. The downwardly-extending curved portions 20 fit between the upper sides of the runners 33 and the approach portions 34 are then clamped over the trolley wires.

While I have shown and described but two embodiments of the present invention, it will be apparent to those skilled in the art that various modifications thereof may be made without departing from the spirit and scope of this invention and, therefore, I wish to be limited only by the scope of the prior art and the appended claims.

I claim:

1. A trolley guide comprising an upper member for positioning the trolley wires and a lower member for guiding a trolley, the upper member having an upwardly bowed channel in its upper side to receive a trolley wire, and having means adjacent the ends of said channel for holding the wire down in said channel.

2. A trolley guide comprising an upper member for positioning the trolley wires and a lower member for guiding a trolley, the upper member having an upwardly bowed channel in its upper side to receive a trolley wire, and having means formed therein adjacent the ends of said channel for holding the wire down in said channel.

3. A trolley guide comprising an upper member for positioning the trolley wires and a lower member for guiding a trolley, said upper member having an upwardly bowed channel in its upper side to receive a trolley wire and having slots therein for holding the wire down in said channel.

4. A trolley guide comprising an upper member for positioning the trolley wires and a lower member for guiding a trolley, said upper member having an upwardly bowed channel in its upper face to receive a trolley wire and having slots extending inwardly from the sides thereof adjacent the outer ends of said upwardly bowed channel for holding the wire down in said channel.

5. A trolley guide comprising an upper member for positioning the trolley wires and a lower member for guiding a trolley, said upper member having an upwardly bowed channel in its upper face to receive a trolley wire and having downwardly facing channels adjacent the ends of said upwardly bowed channel for receiving the wire and holding it down in said upwardly bowed channel.

6. A trolley guide comprising an upper member for positioning the trolley wires and a lower member for guiding a trolley, said upper member having an arm with an upwardly bowed channel in the upper face thereof to receive a trolley wire, said arm having slots therein for holding the wire down in said channel, and another arm at an angle to said first mentioned arm for engaging a second trolley wire.

7. A trolley guide comprising an upper member for positioning the trolley wires and a lower member for guiding a trolley, said upper member having an arm with an upwardly bowed channel in the upper face thereof to receive a trolley wire, said arm having slots extending inwardly from the sides thereof adjacent the ends of said channel for holding said wire down in said slot, and another arm at an angle to said first mentioned arm for engaging a second trolley wire.

8. A trolley guide comprising an upper member for positioning the trolley wires and a lower member for guiding a trolley, said upper member having an upwardly bowed channel in its upper face to receive a trolley wire and having means adjacent the ends of said channel for holding the wire down in said channel, said lower member having upwardly opening channels adapted to receive and grip the trolley wires, the outer portions of said channels serving as runners for the trolley.

9. A trolley guide comprising an upper member for positioning the trolley wires and a lower member for guiding a trolley, said upper member having an arm with an upwardly bowed channel in the upper face thereof to receive a trolley wire, and means formed in said arm for holding said wire down in said slot, and another arm at an angle to said first mentioned arm for engaging a second trolley wire, said lower member having arms similarly positioned with respect to the arms of said upper member, the arms of said lower member having upwardly opening channels adapted to receive and grip the trolley wires, the outer portions of said channels serving as runners for the trolley.

10. A trolley cross-over comprising an upper cross arm member and a lower cross arm member, the cross arms of the upper member having upwardly bowed channels in their upper sides to receive the crossed wires and having means adjacent the ends of the channels for holding the wires down in said channels, the cross arms of the lower member having upwardly opening channels for receiving and gripping the crossed wires, the outer portions of said channels serving as runners for the trolley.

11. A trolley cross-over comprising an upper cross arm member and a lower cross arm member, the cross arms of the upper member having upwardly bowed channels in their upper sides to receive the crossed wires and having slots therein for holding the wires down in said channels, the cross arms of the lower member having upwardly opening channels for receiving and gripping the crossed wires, the outer portions of said channels serving as runners for the trolley.

12. A trolley cross-over comprising an upper cross arm member and a lower cross arm member, the cross arms of the upper member having upwardly bowed channels in their upper faces to receive the crossed wires and having slots extending inwardly from the sides thereof adjacent the outer ends of said upwardly bowed channels for holding the wires down in said channels, the cross arms of the lower member having upwardly opening channels for receiving and gripping the crossed wires, the outer portions of said channels serving as runners for the trolley.

13. A trolley cross-over comprising an upper cross arm member and a lower cross arm member, the cross arms of the upper member having upwardly bowed channels in their upper faces to receive the crossed wires and having downwardly facing channels adjacent the outer ends of said arms for receiving the crossed wires and holding them down in said upwardly extending channels, the cross arms of the lower member having upwardly opening channels for receiving and gripping the crossed wires, the outer portions of said channels serving as runners for the trolley.

14. A trolley cross-over comprising an upper cross arm member, and a lower cross arm member, the cross arm of the upper member having upwardly bowed channels in their upper faces to receive the crossed wires and having slots extending inwardly from the sides thereof adjacent the outer ends of said upwardly bowed channels, downwardly facing channels adjacent the outer ends of said arms for receiving the crossed wires and